United States Patent
Greenzeiger et al.

(10) Patent No.: US 9,633,368 B2
(45) Date of Patent: Apr. 25, 2017

(54) CONTENT RANKING AND SERVING ON A MULTI-USER DEVICE OR INTERFACE

(75) Inventors: Michael Froimowitz Greenzeiger, Santa Clara, CA (US); Mehul K. Sanghavi, Sunnyvale, CA (US); Ravindra Phulari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 831 days.

(21) Appl. No.: 13/480,724

(22) Filed: May 25, 2012

(65) Prior Publication Data
US 2013/0317828 A1 Nov. 28, 2013

(51) Int. Cl.
*G10L 21/00* (2013.01)
*G06F 17/00* (2006.01)
*G06Q 30/02* (2012.01)
*G06F 17/30* (2006.01)

(52) U.S. Cl.
CPC ......... *G06Q 30/0251* (2013.01); *G06F 17/30* (2013.01)

(58) Field of Classification Search
CPC ....................................................... G10L 15/22
USPC ........................................................ 704/275
See application file for complete search history.

(56) References Cited

U.S. PATENT DOCUMENTS

| 5,812,865 | A | 9/1998 | Theimer et al. | |
|---|---|---|---|---|
| 7,181,438 | B1 * | 2/2007 | Szabo | G06F 17/30522 |
| 8,275,623 | B2 * | 9/2012 | Scott | G06Q 30/02 |
| | | | | 704/235 |
| 8,285,573 | B1 * | 10/2012 | Ballaro | G06Q 10/087 |
| | | | | 705/22 |
| 2007/0214470 | A1 | 9/2007 | Glasgow et al. | |
| 2007/0282912 | A1 * | 12/2007 | Reiner | A61B 5/411 |
| 2009/0030899 | A1 * | 1/2009 | Tareen | G06F 17/30722 |
| 2009/0083269 | A1 * | 3/2009 | Artz, Jr. | H04L 63/10 |
| 2010/0114709 | A1 | 5/2010 | Athsani et al. | |
| 2011/0015990 | A1 * | 1/2011 | Sanghavi | G06Q 10/087 |
| | | | | 705/14.43 |
| 2011/0153377 | A1 * | 6/2011 | Novikov | G06Q 10/063 |
| | | | | 705/7.11 |
| 2011/0153429 | A1 | 6/2011 | Ullah | |

(Continued)

OTHER PUBLICATIONS

Daniel John Vogel, "Interactive Public Ambient Displays," Master's Thesis, University of Toronto, 2005, available online at http://www.nonsequitoria.com/research/interactive_public_ambient_displays/Vogel_Interactive_Public_Ambient_Displays%20_MSc_Thesis.pdf, last visited May 24, 2012.

*Primary Examiner* — David Hudspeth
*Assistant Examiner* — Timothy Nguyen
(74) *Attorney, Agent, or Firm* — Polsinelli LLP (57) ABSTRACT

The effectiveness of targeted content delivery at a multi-user interface can be directly linked to a proper targeting of users. A way of improving targeted content delivery at a multi-user interface can be to determine which users should be targeted based on one or more criteria. The present technology provides various methodologies for selecting one or more users associated with a multi-user interface to receive targeted content. Such users can be selected based on criteria associated with a ranking or priority of the users, criteria associated with an analysis of their interactions with the multi-user interface, criteria based on their most common characteristics, or any combination thereof. The user characteristics associated with such identified used can then be utilized to determine which content should be delivered to the multi-user interface.

15 Claims, 6 Drawing Sheets

(56) References Cited

U.S. PATENT DOCUMENTS

| | | | |
|---|---|---|---|
| 2011/0173102 A1* | 7/2011 | Burns | G06Q 30/02 705/27.2 |
| 2011/0225040 A1* | 9/2011 | Yerli | G06Q 30/02 705/14.49 |
| 2012/0047087 A1* | 2/2012 | Amidon | G06Q 30/0282 705/347 |
| 2012/0077528 A1* | 3/2012 | Martin | H04W 4/206 455/466 |
| 2012/0151359 A1* | 6/2012 | Mysen | G06F 11/3438 715/736 |
| 2013/0290905 A1* | 10/2013 | LuVogt | G06N 3/006 715/835 |

\* cited by examiner

CONTENT RANKING AND SERVING ON A MULTI-USER DEVICE OR INTERFACE

BACKGROUND

1. Technical Field

The present disclosure relates to targeted content delivery and, more specifically, to intelligent targeting of invitational content to a multi-user interface.

2. Introduction

Targeted content delivery has long been an accepted means of conveying a desired message to an audience. Instead of creating a single message and delivering it to every member of the general public, a content provider would prefer to identify a segment of the population that is likely to have the greatest interest in their message. A key aspect in targeted content delivery is identifying an individual associated with a particular device or interface and delivering targeted content to the individual if his characteristics satisfy the target demographics for a particular item of targeted content.

However, delivering targeted content to a device or interface associated with multiple individuals can pose a challenge for several reasons. First, there is an initial challenge of consistently and correctly identifying the multiple individuals. Second, even when such identification is possible, the different individuals may be associated with different characteristics. Moreover, such characteristics may be inconsistent or conflicting. Accordingly, there is the additional challenge of determining which characteristics to utilize for targeted content delivery. As a result, conventional techniques for targeted content delivery will generally be inadequate for delivery of targeted content to multi-user interfaces.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for selecting content for delivery by a content delivery system to a multi-user interface. The general methodology includes identifying users associated with the multi-user interface, obtaining user characteristics for these identified users, determining a set of user characteristics based on a set of derivation rules, and selecting content at a content delivery system based on the set of user characteristics. The identification of users and user characteristics can be performed via a characteristic selection system that is part of, or separate from, the content delivery system.

The set of user characteristics can be obtained in a variety of ways. In a first methodology, the relative priority or ranking of the user can be obtained. Based on this ranking, delegate users associated with the highest ranking or priority can be identified. There after the user characteristics for these delegate users can be utilized as the set of user characteristics for the multi-user interface.

In a second methodology, the interactions at the multi-user interface can be attributed to different users. Based on these interactions, delegate users can be identified and the user characteristics for these users can be utilized as the set of user characteristics for the multi-user interface.

In a third methodology, the characteristics common to the users can be identified. If these common characteristics meet minimum set criteria, they can be utilized as the set of user characteristics for the multi-user interface. If not, a default set can be used instead. Additionally, these methodologies can be combined.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
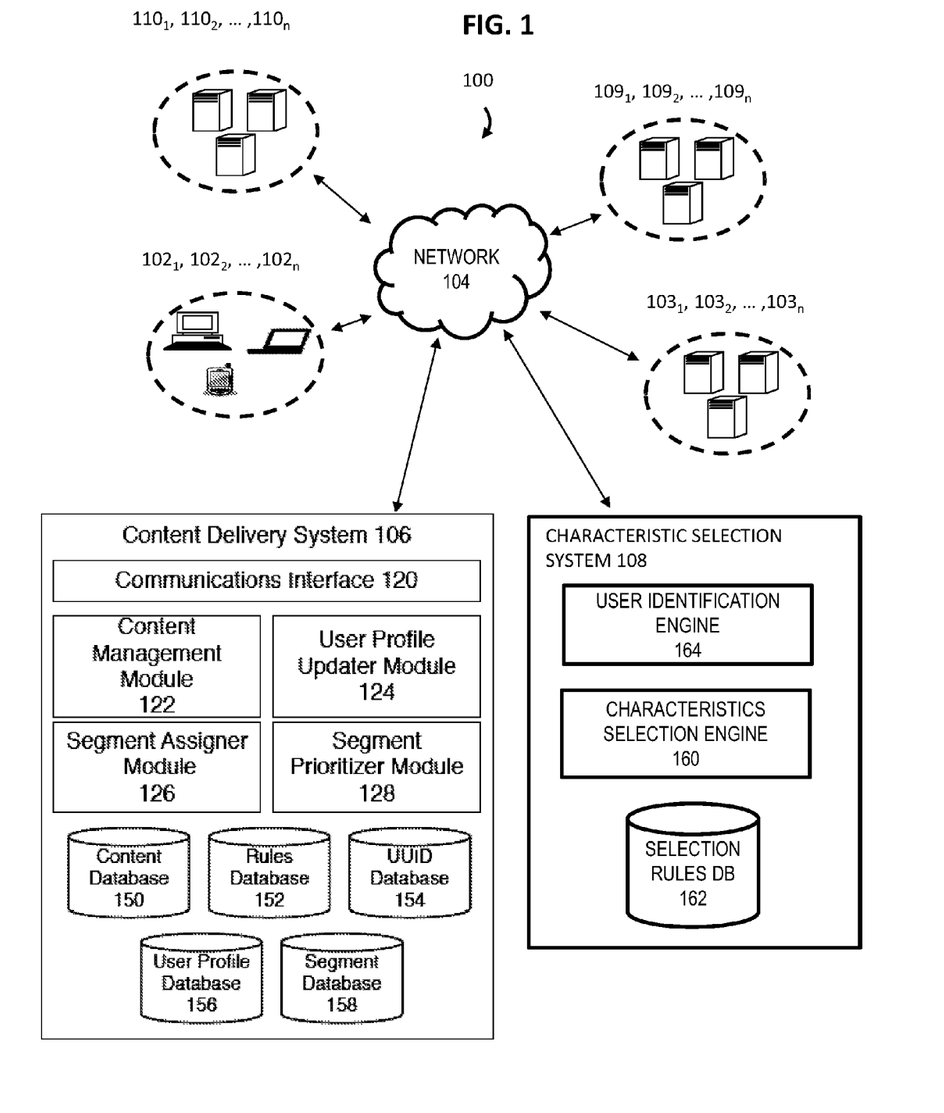
FIG. 1 illustrates an exemplary configuration of devices and a network.

The present disclosure addresses the need in the art for improved targeted content delivery for multi-user interfaces. Using the present technology it is possible to generate a set of user characteristics for selecting targeted content from the user characteristics of the multiple users associated with a multi-user interface or device. An exemplary system configuration 100 is illustrated in FIG. 1 wherein electronic devices communicate via a network for purposes of exchanging content and other data. The system can be configured for use on a local area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1, 102_2, \ldots, 102_n$ (collectively "102")

connected to a network 104 by direct and/or indirect communications with a content delivery system 106. The user terminals 102 can, individually, collectively, or in combination with other components of system 100, provide a multi-user interface.

As used herein, the term "multi-user interface" refers to any type of user interface, or a system providing a user interface, that includes one or more elements or components, which can be concurrently accessed by multiple users. Alternatively stated, a multi-user interface can refer to any type of user interface that allows multiple users to engage in a session or activity concurrently. Multi-user devices and interfaces include televisions, radio broadcasting, group chat (on desktop/mobile devices), multi-touch tablet surfaces, bi-directional/web camera technologies, and more. Some of these devices, such as tablet computers or televisions tend to be shared between multiple users within a household. The elements of the multi-user interface can be text-based elements, graphical elements, audio elements, video elements, any other interface elements, and any combinations thereof. Further, the elements can be input elements, output elements, or any combination thereof. In some configurations, the multi-user interface can be provided via a single one of devices 102. That is, multiple users can concurrently interact with an interface, or elements thereof, via the same device. In other configurations, the multi-user interface can be provided via multiple ones of devices 102, each associated with at least one user, engaged in a concurrent session or activity. In such configurations, the multi-user session or activity can be managed in a centralized fashion via one or more of collaborative servers $103_1, 103_2, \ldots, 103_n$ (collectively "103"). Alternatively, session can be managed by the devices 102 themselves and the role of the collaborative servers 103 can be to provide communications between the ones of device 102 engaged in the multi-user session. However, the present technology is not limited in this regard and the multiple one of devices can communicate directly with each other in a decentralized or ad-hoc manner.

The content delivery system 106 can support connections from a variety of different client devices 102, such as desktop computers; mobile computers; handheld communications devices, e.g. mobile phones, smart phones, tablets; and/or any other network enabled communications devices. Furthermore, content delivery system 106 can concurrently accept connections from and interact with multiple client devices 102. The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1, 109_2, \ldots, 109_n$ (collectively "109") and content from one or more secondary content providers $110_1, 110_2, \ldots, 110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery systems 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. However, the various embodiments are not limited in this regard and the invitational content can include static invitational content that does not vary over time or with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal 102. For example, a first content package can include an app that can be installed on the user terminal 102. A subsequent content package can include one or more items of invitational content that can be presented to a user of the user terminal 102 while the user interacts with the app.

Although, primary and secondary providers 109 and 110 are presented herein as separate entities, this is for illustrative purposes only. In some cases, the primary and the secondary content providers 109 and 110 can be the same entity. Thus, a single entity can define and provide both the primary and the secondary content.

The content delivery module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database is up to date at the time of a request from a user terminal 102. However, in some cases, the content management module 122 can be configured to retrieve content directly from content providers 109 and 110, if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, these rules can be stored in a content delivery system (CDS) rules database 152 in content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109, and including variable advertisement portions, the rules database 152 can specify rules for selecting one of the secondary providers 110. The rules can also specify how to select specific content from the selected one of secondary providers 110 to be combined with the content provided by one of primary providers 109. Once assembled, the assembled content package can be sent to a requesting one of user terminals 102.

As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channels, demographics, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. As will become apparent from the remainder of this disclosure, the content delivery system 106 can learn of or derive user characteristics from any number of other information sources.

In some embodiments, the invitational content provided by the secondary content providers 110 can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect. For example, if separate dimensions are specified for city and state, these dimensions are non-orthogonal.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals 102 connecting using multiple or non-persistent network sessions, multiple requests for content from such devices may be assigned to a same entry in the UUID database 154. The delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 154 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the profile database 156 to include only more recently acquired data or to re-derive any inferred characteristics in order to ensure that the user profile is an accurate reflection of the current state of the user (location, state of mind, behaviors, demographics, etc. can change rapidly). For example, the updater module 124 can be configured to maintain the profile database 156 to include only data from the last two to three months. However, the updater module 124 can be configured to adjust the data in profile database 156 to cover any span of time. In some instances the updater module 124 can update the profile database 156 in real-time. Alternatively, the updater module 124 can be configured to set an expiration period on a subset of the data in the profile database 156. For example, a policy can specify that user declared data is maintained as long as the user account is active, but user characteristic values based on location information expire after a specified period of time. In some cases, a user can set the expiration period. In some instances, the updater module 124 can update the profile database 156 at least every week, or every day. In some cases, the delivery system 106 can receive a direct request to update one or more user profiles. The update request can come directly from the user's device or any other device capable of communicating with the delivery system 106, such as other content delivery networks or websites. In some cases, the delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system 106 can match invitational content with users. In some embodiments, the delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the delivery system 106.

In some embodiments, the content delivery system 106 can provide a segment-prioritizing module 128 for ordering the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some content delivery systems, the selection of an item of secondary content can be based, at least on part, on the characteristics of a user associated with a user terminal or a session associated with the user. For example, the CDS rules database 152 can specify that the delivery of a particular item of secondary content should be limited to users meeting a specific set of criteria.

However, when multiple users are associated with the same user terminal or session, this process can be challenging. That is, each user can be associated with different user characteristics that would result in the selection of different items of secondary content based on the rules in the CDS rules database 152. Although one potential solution is to simply provide all of these different items at the device or interface, such an approach would be impractical in many circumstances. For example, a device or interface may only have limited capability or capacity for presenting such items to the user. Further, the communications links for the device or interface may only have a limited capability or capacity for receiving such items. As a result, lag or time delays can be introduced if a significant number of items need to be provided to the device or interface. Moreover, in the case of a multi-user interface, such an arrangement can result in invitational content of little or no interest being presented to many users. Worst yet, such an arrangement can result in invitational content of little or no interest being presented to a decision-maker among the multiple users.

In view of the foregoing, the present technology disclosed herein provides systems and methods for intelligently targeting invitational content for a multi-user interface. A first aspect of the present technology provides systems and methods for deriving a set of user characteristics from the characteristics of the individual users based on the interactions of the users at the multi-user interface and selection criteria or rules. A second aspect of the present technology provides systems and methods for deriving a set of user characteristics from the characteristics of the individual users based on a relative ranking or priority of the users at the multi-user interface and selection criteria or rules. A third aspect of the present technology provides systems and methods for deriving a set of user characteristics by aggregating the characteristics of the users at the multi-user interface based on selection criteria or rules.

In view of the foregoing, the system 100 can also be configured to include a characteristic selection system 108 that generates a set of user characteristics to be used by the content delivery system 106 for selecting and delivering content to ones of the user terminals 102 associated with a multi-user interface or device. The characteristic selection system 108 can receive information associated with users at a user terminal 102 associated with a multi-user interface. For example, the characteristics selection system 108 can receive information regarding user characteristics, user interactions, or both. Whether the characteristic selection system 108 receives such information from the content delivery system 106, the user terminals 102, or other sources can vary with the configuration of the system 100.

The characteristic selection system 108 can include a characteristic selection engine 160 and a selection rules database (DB) 162. The selection rules DB 162 can specify rules for the characteristics selection engine 160 to analyze the user characteristics from the various users accessing the one or more of user terminals 102 associated with the multi-device or interface and determine a set of user characteristics for the content delivery system 106 to utilized to select content to be delivered to the one or more of user terminals 102.

The present disclosure contemplates that the rules in selection rules DB 162 can depend on any number of factors or conditions. Some exemplary factors and conditions include:
1. Number of users. This input will identify the minimum number of users who are engaged with the device at time of the request for content. The number of users can also reflect the total number of users who may be engaged with the device—some of whom may not be recognized or maybe participating passively.
2. Device make/model/form factor. This input identifies what type of device is requesting the content along with other engaged devices. For example, users could be simultaneously engaging with a smart TV platform with one or more mobile/tablet devices.
3. Input methods. This input will determine the input method used by the users of the multiuser device. For example, an online gaming platform coupled with a smart TV can identify active players (using controllers) along with passive players/spectators (using voice or visuals).
4. User demographics. These inputs identify the user demographics such as age, gender, income etc.
5. User locations. These inputs identify the user locations. A multi-user device may include participants who may not be in the same location.
6. Other information such as current time, sequence of content previously served, user preferences, content ratings and more.

However, the present technology is not limited in this regard and the present disclosure contemplates that any other factors and conditions can be considered.

In some configurations, the operation of the characteristic selection system 108 is based on the assumption that the identity of the users is known or is readily ascertainable. For example, the multi-user device or interface can require users to register or login. In such a configuration, the user characteristics for the users can then be directly obtained from user profile database 156 or any other source of user characteristic data. However, in other configurations, the identity of the users may not be known beforehand. Accordingly, in such configurations, the characteristic selection system 108 can further include a user identification engine 164. The user identification engine can then be used to identify the users associated with the multi-user interface or device or at least determine or estimate the user characteristics for such users. The operation of the characteristic selection system 108 within system 100 will be described in greater detail with respect to FIGS. 3-5.

Although the characteristic selection system 108 is presented here as a separate entity, this is for ease of illustration and discussion. The present disclosure contemplates that the content delivery system 106 can include the characteristic selection system 108. Alternatively, user terminals 102 can each include all or part of a characteristic selection system 108.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
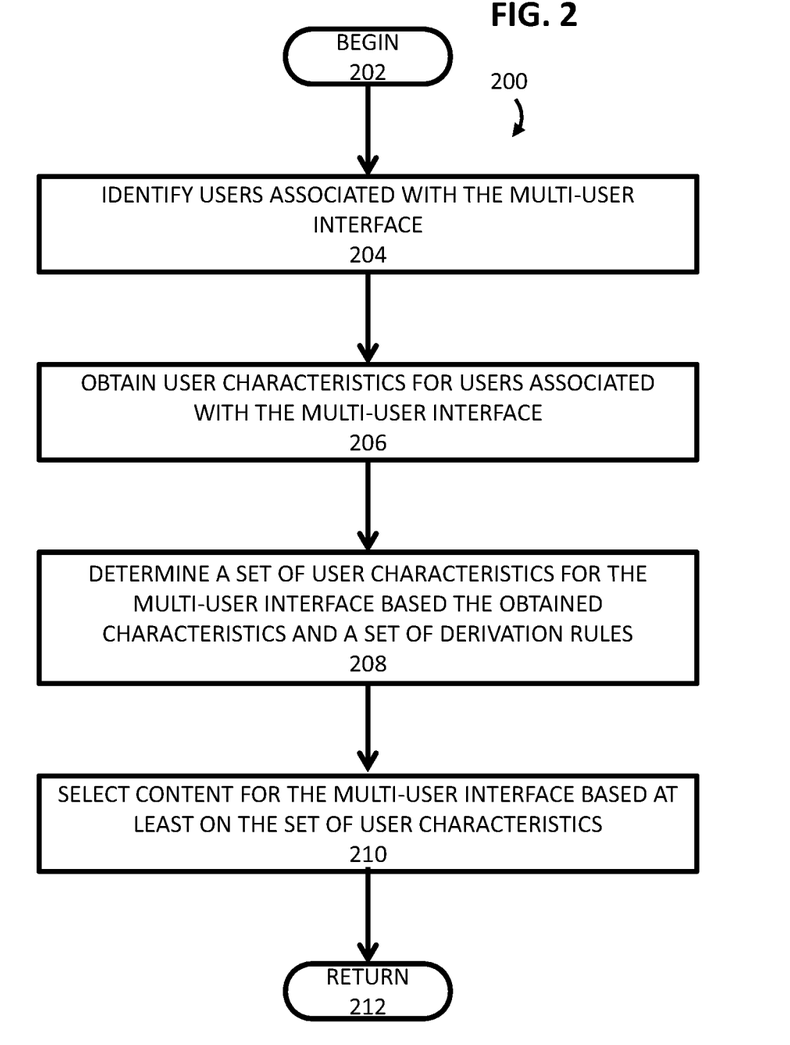
FIG. 2 illustrates an exemplary method embodiment for selecting content for a multi-user interface.

Now turning to FIG. 2, there is shown a flowchart illustrating steps in an exemplary method 200 for selecting items of content to be delivered to a multi-user interface. For the sake of clarity, this method is discussed in terms of an exemplary system such as is shown in FIG. 1. Although specific steps are shown in FIG. 2, in other embodiments a method can have more or less steps than show.

Method 200 can begin at step 202 and proceed to step 204. At step 204, the users associated with the multi-user interface can be identified. This can encompass configuring the user identification engine 164 of characteristic selection system 108 to obtain identification information for the various users associated with the multi-user interface or device. For example, this identification information can be obtained directly from the one or more of user terminals 102 associated with the multi-user interface. In cases where the session at the multi-user interface or device is managed by one or more of servers 103, this identification information can be obtained from servers 103. In still another configuration, the user identification information can be obtained from a combination of sources, including user terminals 102, servers 103, or any other components associated with system 100. In such a configuration, the users may have registered, logged in, or otherwise identified themselves during the session associated with the multi-user device or interface.

The present disclosure contemplates that user identification information may not be readily available for one or more of the users. In some configurations, if information for other users is available, then the absence of such information may be ignored by system 100 and items of content for the multi-user interface can be selected based solely on the known information. However, in other configurations, the user information can be inferred from other types of information available from the user terminals 102 or events occurring at the user terminals 102. That is, although the actual users may not be identifiable, the profile of the user may be ascertained to at least identify some characteristics of the user which can be used to infer identity information for the user. For example, these can include the type of content being presented via the multi-user interface, the content of user interactions at the multi-user interface, the characteristics of user interactions at the at multi-user interface, the type of device associated with the user, and location data for the device associated with the user, to name a few. However, the various embodiments are not limited in this regard and any other type of information can be utilized to infer the user identity information.

Once the identities of the users at the multi-user interface are determined at step 204, the method 200 can proceed to step 206. At step 206, the user characteristics for the identified users can be obtained. For example, the user identification engine 164, as part of the identification process, can retrieve user characteristic information from user profile database 156. Alternatively, characteristics selection engine 160 can retrieve this information from user profile database 156 as part of the process for selecting a set of user characteristics. In a further example, the characteristic selection system 108 can include additional functionality outside that of engines 160 and 164 from accessing and retrieving user characteristic information. Further, although FIG. 1 shows this information as being stored and retrieved from content delivery system 106, the user profile database 156 can be stored elsewhere in system 100, including within characteristic selection system 108.

In the case where user identity is inferred, the inferred user identity information obtained at step 204 can be user characteristic information. However, the present disclosure contemplates that the inferred user identity information can specify a category for a user and that this category is then used to identify a group of user characteristics typically associated with a user in such a category.

Once the user characteristic data is obtained at step 206, the method 200 can proceed to step 208. At step 208, the characteristics selection engine 160 can then derive a set of user characteristics for use by the content delivery system 106. In particular, the characteristics selection engine 160 can examine the user characteristic data, alone or in combination with other types of data or information, in view of the rules in selection rules DB 162. Based on these rules, a set of user characteristic data can be derived and delivered to the content delivery system 106 for processing. The operation of the characteristics selection engine 160 will be described in greater detail below with respect to FIGS. 3, 4, and 5.

Once the set of user characteristics are selected at step 208, the method can proceed to step 210. At step 210, the set of user characteristic data can then be used to select an appropriate item of content for the multi-user interface or device. The method 200 can then resume previous processing at step 212, including repeating method 200.

Figure 3:
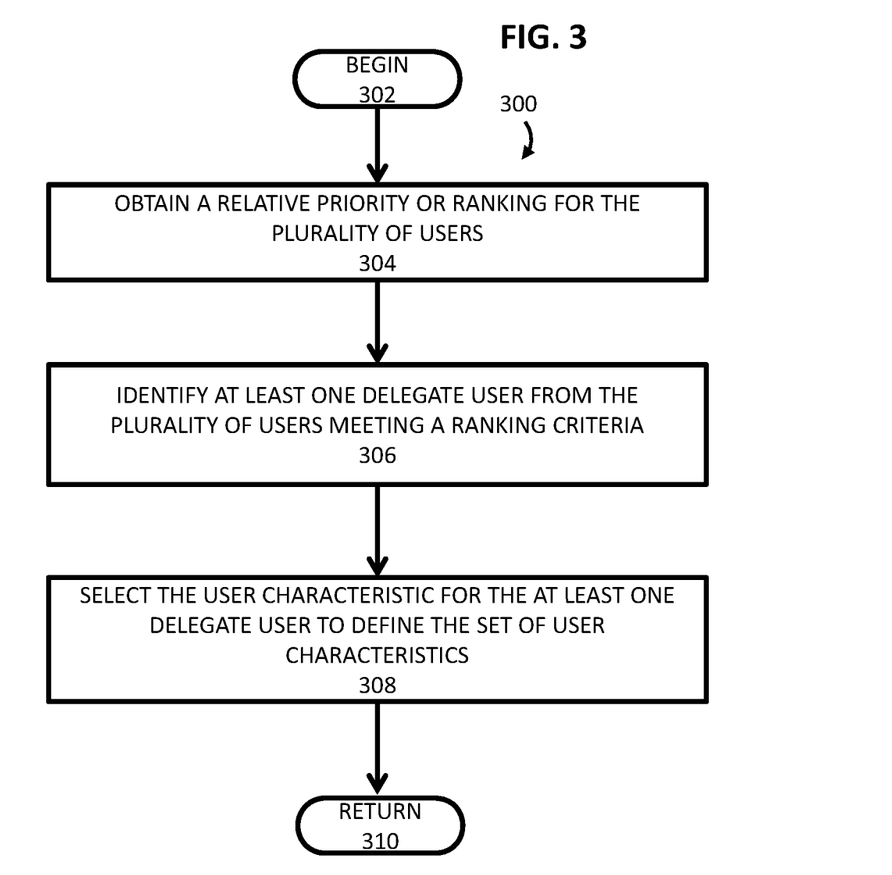
FIG. 3 illustrates a first exemplary method embodiment for determining a set of user characteristics for selecting content for a multi-user interface.
Figure 4:
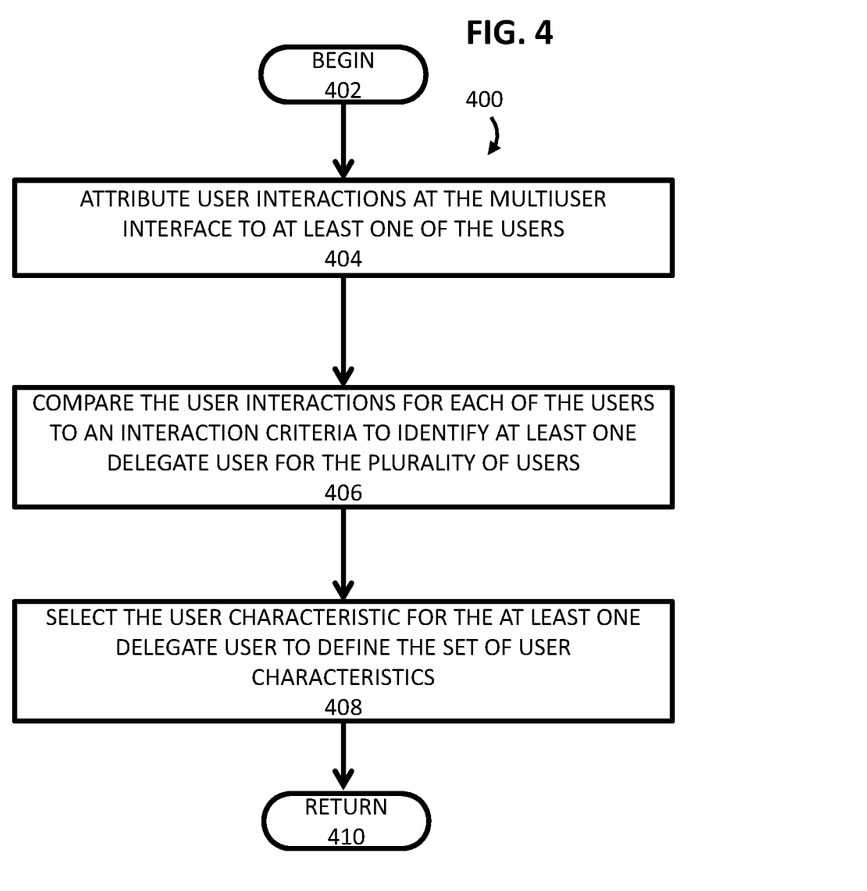
FIG. 4 illustrates a second exemplary method embodiment for determining a set of user characteristics for selecting content for a multi-user interface.
Figure 5:
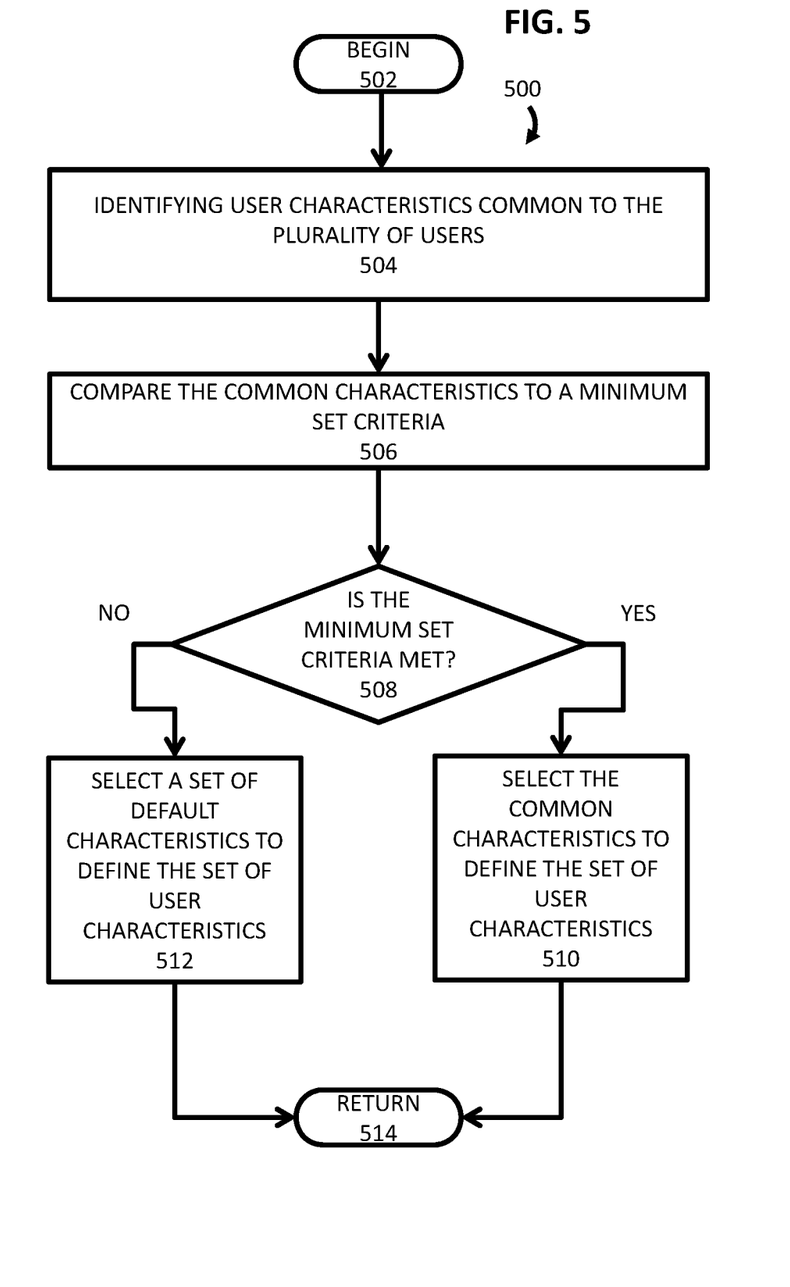
FIG. 5 illustrates a third exemplary method embodiment for determining a set of user characteristics for selecting content for a multi-user interface.

As noted above, a primary concern with multi-user interfaces is that although there may be multiple users associated with a session at a multi-user interface, in some instances only one or a few of these users should actually be targeted. For example, in the case of a multi-user interface being utilized by a parent and a child, targeting the child with an advertisement or other type of invitational content may be of little or no use. In such a scenario, financial decisions are likely being made by the parent, not the child. Accordingly, targeting the parent would be a more effective use of targeted content. The same situation comes up in various other scenarios. For example, a session using a multi-user interface involving employer(s) and employee(s), supervisor(s) and worker(s), caregiver(s) and patient(s), teacher(s) and student(2), or any other group of users in which one or more of the users is in a supervisory, guardianship, or decision-making role with respect to the other users associated with the multi-user interface. FIGS. 3, 4, and 5 provide some exemplary methodologies for addressing such scenarios.

A first exemplary methodology is to base the set of user characteristics on known priority or ranking data for the users. This is illustrated with respect to FIG. 3. FIG. 3 shows a flowchart illustrating steps in a first exemplary method 300 for selecting a set of user characteristics in accordance with the present technology. Method 300 could be performed, for example, during step 208 in FIG. 2.

Method 300 begins at step 302 and continues on to step 304. At step 304, a relative priority or ranking of the users is obtained. In some configurations, the relative priority or ranking can be computed a priority or is otherwise already known. For example, when the users are identified by user identification engine 164 or the user characteristics are provided to characteristics selection engine 160, a relative ranking or priority of the users associated with this information can be provided as well. In some configurations, the ranking can be a numerical value. However, the present disclosure also contemplates that the ranking can be provided by categorizing the users based on user information, such as the user characteristics stored in user profile database 156. However, the present technology is not limited in this regard and the characteristics selection system 108 can compute or otherwise discern the relative priority of the users from the user characteristic information or any other information associated with the users and made available to the characteristic selection system 108.

For example, the user characteristics may specify job title, description, or other information that indicates the relative position or category of the users within the group. In another example, the user characteristics regarding age may indicate that one user is an adult and that the other users are children. Other demographic information can be similarly used. In still another example, a formula can be provided from which a numerical ranking can be computed based on user information. In such a configuration, the relative importance of various types of user information can be weighted to provide the ranking. However, the present technology is not limited to these examples and the present disclosure contemplates that other types of user information can be utilized to discern a relative priority or ranking. Further, the present disclosure contemplates that the methodology for discerning the relative priority or ranking can be specified by a content provider, users associated with the multi-user interface, or any combination thereof.

Once the relative priority or ranking of the users is obtained at step 304, the method 300 can proceed to step 306. At step 306, at least one delegate user from the plurality of users associated with the multi-user interface is selected based on ranking criteria. That is, the characteristics selection engine 160 can select users based on rules stored in the selection rules DB 162 specifying criteria for identifying users. For example, the rules associated with the ranking criteria can specify to select the highest ranked or highest priority user. In another example, the rules associated with the ranking criteria can specify to select a user associated with a particular position (e.g., teacher, supervisor, etc.). In still another example, a combination of different methods can be utilized to identify a highest ranked or priority user.

The present disclosure also contemplates that more than one user could be targeted. That is, there may be multiple users in a supervisory, guardianship, or decision-making role with respect to the other users. Accordingly, the rules associated with the ranking criteria can specify selection of multiple users. For example, such users can be identified based on the category of user. In another example, the rules associated with the ranking criteria can specify to select the $n^{th}$ highest ranked users, the users associated with some minimum ranking or priority, or a combination of both.

After the delegate users are selected at step 306, the set of user characteristics for the content delivery system 106 can be selected at step 308. In the case of a single delegate user being identified at step 306, the user characteristics for this single delegate user can be selected for use by the content delivery system 106. In the case of multiple delegate users being identified at step 306, additional rules can be specified at selection rules DB 162 to allow the characteristics selection engine 160 to generate the set of user characteristics for content delivery system 106. This generating can occur in a variety of ways based on these additional rules.

In one example, the set of user characteristics can be selected to include those characteristics that are common among the delegate users. In some configurations, an exact match can be required for inclusion. In another configuration, if all of the users are associated with sub-characteristics of a more general characteristic, the general characteristic can be selected for the set of user characteristics. In still another example, the set of user characteristics can be selected on the relative ranking or priority of the delegate users. That is, if no user characteristics are common for the delegate users, the set of user characteristics can be based on the highest ranked or priority delegate user or users. In still configurations, rather than requiring completely common characteristics, partially common characteristics can be selected. For example, if a set of user characteristics cannot be selected because the user characteristics of the delegate users are contradictory, a set of user characteristics that is common to a majority of the delegate users can be selected. Similarly, a set of user characteristics that is common to at least the $n^{th}$ highest ranked ones of the delegate users can be selected.

Referring back to FIG. 3, after the set of user characteristics is selected at step 308, the method 300 can resume previous processing at step 310. This can include resuming method 200 in FIG. 2 or repeating method 300. Method 300 relies on the assumption that priority or ranking information is directly or indirectly available from information stored for the users. However, in some instances such information may not be available. Accordingly, in such configurations, the relative ranking or priority information for the user can be discerned from their interactions with the multi-user interface. Such a methodology is illustrated below with respect to FIG. 4.

FIG. 4 shows a flowchart of steps in a second exemplary method 400 for determining a set of user characteristics for content delivery system 106. Method 400 could be performed, for example, during step 208 in FIG. 2. Method 400 begins at step 402 and continues on to step 404. At step 404, user interactions at the multi-user interface can be attributed to different users. For example, the user identification engine 164 can attribute interactions originating at different sources (e.g., different devices) can be to different users, thus identifying the different users. In another example, the interactions can be analyzed to determine whether or not they come from different sources. That is, different users will generally be associated with different types of audio, visual, textual, or gestural (i.e., touchscreen or pointing device) interactions. For instance, in the case of a spoken or audio interaction, the biometrical features of the users' speech (e.g., pitch, tone, volume, individual phonemes) can be used to identify different users. Other types of interactions can be similarly analyzed to determine whether interactions are associated with different users.

After the interactions are attributed to different users at step 404, delegate users can be identified at step 406. For example, the user identification engine 164 can access rules stored in selection rules DB 162 or elsewhere to determine which of the identified users should be designated a delegate user. In particular, the rules can specify interaction criteria to identify the types of interactions associated with users to be targeted. For example, in the case of identified users being associated with child voices and adult voices at the multi-user interface, the rules can specify selecting, as delegate users, the identified users associated with adult voices. In another example, the content, tone, or other characteristics of voices can be utilized to select the identified user that is most influential or most likely the decision-maker. That is, an identified user associated with a voice that includes more command words or confident tones. In yet another example, the frequency or volume of a voice can indicate users paying closer attention to the interface and thus users most likely to respond to content. Although the examples above are directed primarily to analyses of voices, the present technology is not limited in this regard. That is, any audio, visual, textual, or gestural interaction at the multi-user interface, or any combinations thereof, can be analyzed to identify those users most likely to be decision-makers and thus the delegate users.

After the delegate users are selected at step 406, the set of user characteristics for the content delivery system 106 can be selected at step 408 using the characteristics selection engine 160. Thereafter the method 400 can proceed to step 410 and resume previous processing, including repeating any of the methods described herein. In some cases, information regarding the various users may be known if registration or login was required to participate in the session at the multi-user interface. Accordingly, selecting the set of user characteristics can be performed in substantially a same manner as described above with respect to FIG. 3. That is, in the case of a single delegate user being identified at step 406, the user characteristics for this single delegate user can be selected for use by the content delivery system 106. Further, in the case of multiple delegate users being identified at step 406, additional rules can be specified at selection rules DB 162 to allow the characteristics selection engine 160 to generate the set of user characteristics for content delivery system 106.

However, in the case where a registration or login process was not required or was not available, the user characteristics can be identified based on the user interactions associated with the delegate users. That is, rules can be specified at selection rules DB 162 that indicate what user characteristics to associate with particular types of user interactions. For example, referring back to the voice example, it may be possible to determine age, gender, race, and various other types of demographic characteristics form the biometrical features of the voice and the content of the speech associated with the voice. Similarly, other audio, visual, textual, or gestural interactions at the multi-user interface, or any combinations thereof, may be associated with particular types of user characteristics. Accordingly, the rules at selection rules DB 162 can be configured to allow an analysis of these interactions to determine these user characteristics. Again, as described above with respect to FIG. 3, in the event that different, conflicting user characteristics are associated with different delegate users, the present disclosure contemplates that additional rules can be specified at selection rules DB 162 to allow the characteristics selection engine 160 to resolve these conflicts and generate the set of user characteristics for content delivery system 106.

The methods described above with respect to FIGS. 3 and 4 are based on the assumption that there is one or a few users who should be targeted at the multi-user interface. However, the present disclosure contemplates that a more general targeting of users can also be performed. This is illustrated with respect to FIG. 5.

FIG. 5 shows a flowchart of steps in a third exemplary method 500 for determining a set of user characteristics for content delivery system 106. Method 500 could be performed, for example, during step 208 in FIG. 2. Method 500 begins at step 502 and continues on to step 504. At step 504, a common set of user characteristics is identified. Selection of common user characteristics can be performed in a manner substantially similar to that described with respect to FIG. 3. That is, the set of user characteristics can be selected to include those characteristics that are common among all of the users associated with the multi-user interface. As described above, some configurations can require an exact match inclusion in the common characteristics. As also described above, a common characteristic can be a general characteristic for which the user characteristics of the users are sub-characteristics.

Once the common characteristics are identified at step 504, it can be necessary to determine whether or not they define a sufficiently large group of characteristics for the content delivery system 106. That is, the rules in selection rules DB 162 can specify a minimum set of requirements for a set of user characteristics. For example, the rules can specify a minimum number of common characteristics or required types of common characteristics. Thus, at step 506, the common characteristics obtained at step 504 can be compared to these minimum set criteria.

Thereafter, at step 508, if the minimum set criteria are met, the common characteristics can be selected at step 510 to define the set of user characteristics. If the minimum set criteria are not met at step 508, the method can instead proceed to step 512. At step 512, an alternate or default set of user characteristics can be defined. This default set can be a set of characteristics that defines a general interest. Such a set can be defined based, for example, on the content at the multi-user interface. In another example, the default set of user characteristics can be specified by one of servers 103 managing the multi-user interface. Alternatively, different sets of user characteristics can be pre-defined and step 512 can encompass comparing the common characteristic to the pre-defined sets and selecting a one of the set that is most similar. Any other methods for identifying a default set can also be used in the present technology without limitation. Regardless of whether method 500 proceeds to step 510 or 512, the method 500 can thereafter proceed to step 514 and resume previous processing, including repeating any of the methods described herein.

Figure 6:
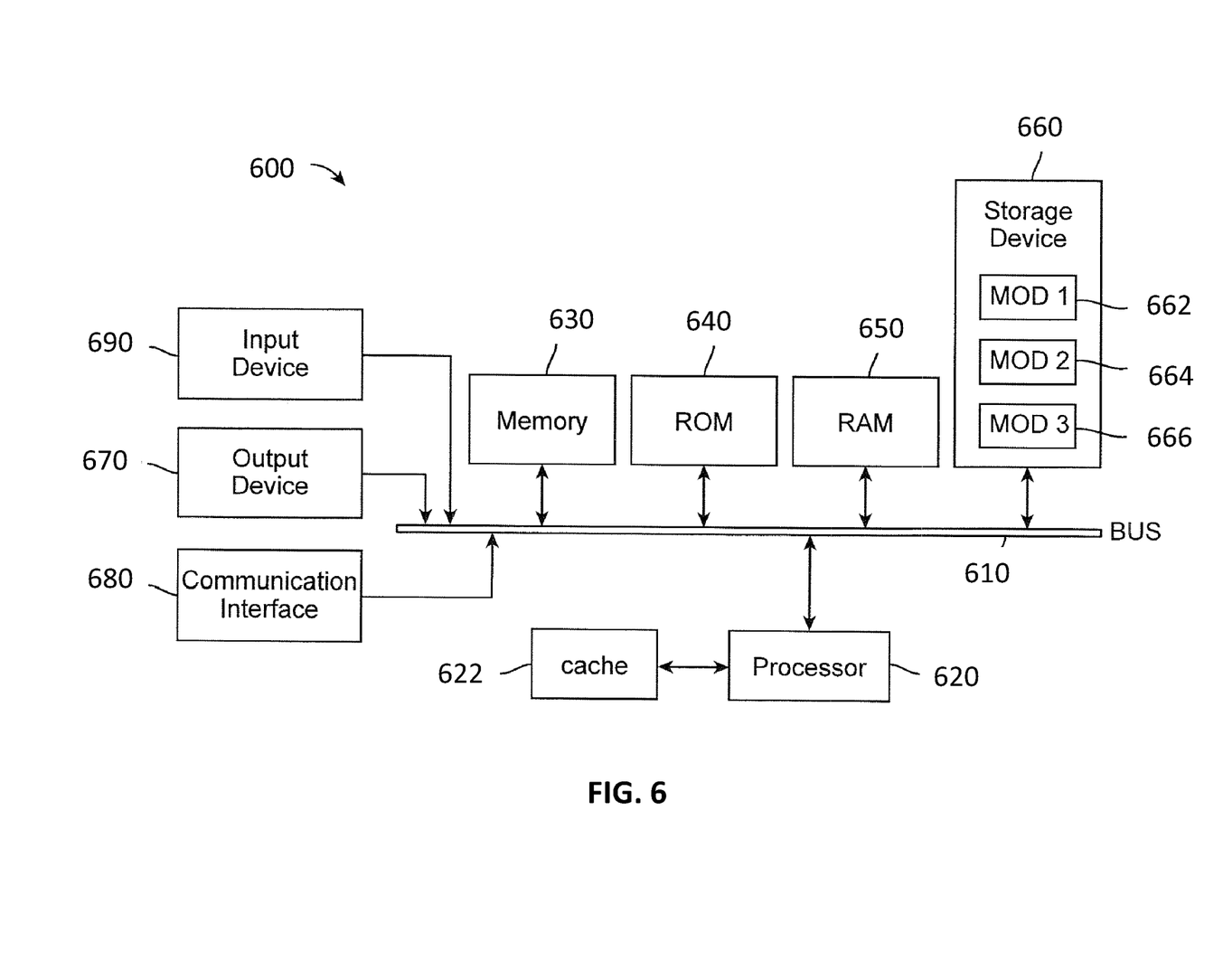
FIG. 6 illustrates an example system embodiment.

Turning now to FIG. 6, shown is an exemplary system 600, which defines a general-purpose computing device for implementing any of the methodologies described above. The system 600, including a processing unit (CPU or processor) 620 and a system bus 610 that couples various system components including the system memory 630 such as read only memory (ROM) 640 and random access memory (RAM) 650 to the processor 620. The system 600 can include a cache 622 connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer readable storage media provide nonvolatile storage of computer readable instructions, data structures, program modules and other data for the computing device 600. In one aspect, a hardware module that performs a particular function includes the software component stored in a non-transitory computer-readable medium in connection with the necessary hardware components, such as the processor 620, bus 610, display 670, and so forth, to carry out the function. The basic components are known to those of skill in the art and appropriate variations are contemplated depending on the type of device, such as whether the device 600 is a small, handheld computing device, a desktop computer, or a computer server.

Although the exemplary embodiment described herein employs the hard disk 660, it should be appreciated by those skilled in the art that other types of computer readable media which can store data that are accessible by a computer, such as magnetic cassettes, flash memory cards, digital versatile disks, cartridges, random access memories (RAMs) 650, read only memory (ROM) 640, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations discussed below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited non-transitory computer-readable storage media. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    detecting, by a processor, user interactions from at least a first user and a second user concurrently engaged with a first client device;
    in response to detecting the user interactions, obtaining, by the processor, user characteristics for the first user and the second user;
    determining, by the processor, an age of the first user and an age of the second user based on the user characteristics of the first user and the second user;
    determining, based on the age of the first user and the age of the second user, that the first user is older than the second user;
    in response to determining that the first user is older than the second user, identifying, by the processor, the first user for targeting; and
    selecting, by the processor, content for the first client device, the content being specifically selected for the first user based on at least one of the user characteristics associated with the first user.

2. The method of claim 1, wherein the obtaining further comprises:
    receiving registration information for the first user and the second user; and
    accessing stored user data to retrieve the user characteristics for the first user and the second user.

3. The method of claim 1, wherein the obtaining further comprises:
    associating a portion of user interactions at the first client device to the first user, wherein the portion of user interactions are detected while the first user and the second user are concurrently engaged with the first client device; and
    generating the user characteristics for the first user based at least on the portion of the user interactions.

4. The method of claim 3, wherein the portion of user interactions comprises at least one of an audio interaction or gestural interaction.

5. The method of claim 1, wherein the user interactions comprise voice interactions, the method further comprising: inferring user characteristics associated with the first user and the second user based on the voice interactions, the user characteristics being inferred based on a feature of at least one of a voice or a content of speech associated with the voice interactions, wherein the first user is identified based the user characteristics inferred.

6. A system comprising:
    one or more computer processors; and
    a memory storing instructions that, when executed by the one or more computer processors, cause the system to:
        detect user interactions from at least a first user and a second user concurrently engaged with a first client device;
        in response to detecting the user interactions, obtain user characteristics for the first user and the second user;
        determine an age of the first user and an age of the second user based on the user characteristics of the first user and the second user;
        determine, based on the age of the first user and the age of the second user, that the first user is older than the second user;
        in response to determining that the first user is older than the second user, identify the first user for targeting; and
        select content for the first client device, the content being specifically selected for the first user based on at least one of the user characteristics associated with the first user.

7. The system of claim 6, wherein the obtaining further comprises:
    receiving registration information for the first user and the second user; and
    accessing stored user data to retrieve the user characteristics for the first user and the second user.

8. The system of claim 6, wherein the obtaining further comprises:
    associating a portion of user interactions at the first client device to the first user, wherein the portion of user interactions are detected while the first user and the second user are concurrently engaged with the first client device; and
    generating the user characteristics for the first user based at least on the portion of the user interactions.

9. The system of claim 8, wherein the portion of user interactions comprises at least one of an audio interaction or gestural interaction.

10. The system of claim 6, wherein the user interactions comprise voice interactions, the instructions further causing the system to:
    infer user characteristics associated with the first user and the second user based on the voice interactions, the user characteristics being inferred based on a feature of at least one of a voice or a content of speech associated with the voice interactions, wherein the first user is identified based the user characteristics inferred.

11. A non-transitory computer-readable medium storing instructions that, when executed by a computing device, cause the computing device to:
    detect user interactions from at least a first user and a second user concurrently engaged with a first client device;

in response to detecting the user interactions, obtain user characteristics for the first user and the second user;

determine an age of the first user and an age of the second user based on the user characteristics of the first user and the second user;

determine, based on the age of the first user and the age of the second user, that the first user is older than the second user;

in response to determining that the first user is older than the second user, identify the first user for targeting; and select content for the first client device, the content being specifically selected for the first user based on at least one of the user characteristics associated with the first user.

12. The non-transitory computer-readable medium of claim 11, wherein the obtaining further comprises:

receiving registration information for the first user and the second user; and accessing stored user data to retrieve the user characteristics for the first user and the second user.

13. The non-transitory computer-readable medium of claim 11, wherein the obtaining further comprises:

associating a portion of user interactions at the first client device to the first user, wherein the portion of user interactions are detected while the first user and the second user are concurrently engaged with the first client device; and generating the user characteristics for the first user based at least on the portion of the user interactions.

14. The non-transitory computer-readable medium of claim 13, wherein the portion of user interactions comprises at least one of an audio interaction or gestural interaction.

15. The non-transitory computer-readable medium of claim 11, wherein the user interactions comprise voice interactions, the instructions further causing the computing device to:

infer user characteristics associated with the first user and the second user based on the voice interactions, the user characteristics being inferred based on a feature of at least one of a voice or a content of speech associated with the voice interactions, wherein the first user is identified based the user characteristics inferred.

* * * * *